United States Patent
Christel et al.

[19]

[11] Patent Number: 6,140,143
[45] Date of Patent: Oct. 31, 2000

[54] METHOD OF PRODUCING A BURIED BOSS DIAPHRAGM STRUCTURE IN SILICON

[75] Inventors: Lee A. Christel, Menlo Park, Calif.; Theodore J. Vermeulen, Portland, Oreg.

[73] Assignee: Lucas Novasensor Inc., Fremont, Calif.

[21] Appl. No.: 07/833,417

[22] Filed: Feb. 10, 1992

[51] Int. Cl.[7] .................................................. H01L 21/00
[52] U.S. Cl. ........................................................... 438/53
[58] Field of Search ................................. 437/228, 3, 51, 437/86, 25, 7, 903, 901, 974; 357/26; 156/628; 148/33.2; 438/52–53, 50

[56] References Cited

U.S. PATENT DOCUMENTS

| | | | |
|---|---|---|---|
| 4,057,822 | 11/1977 | Watanabe | 357/52 |
| 4,133,100 | 1/1979 | Myhre . | |
| 4,204,185 | 5/1980 | Kurtz et al. | 338/4 |
| 4,332,000 | 5/1982 | Petersen | 361/283 |
| 4,376,929 | 3/1983 | Myhre . | |
| 4,480,488 | 11/1984 | Read et al. | 73/862 |
| 4,507,170 | 3/1985 | Myhre . | |
| 4,543,457 | 9/1985 | Petersen et al. | 200/83 |
| 4,588,472 | 5/1986 | Shimizu | 156/628 |
| 4,618,397 | 10/1986 | Shimizu et al. | 156/628 |
| 4,622,856 | 11/1986 | Binder et al. | 73/727 |

(List continued on next page.)

FOREIGN PATENT DOCUMENTS

| | | |
|---|---|---|
| 309782A | 2/1989 | European Pat. Off. . |
| 83-100472 | 6/1983 | Japan . |
| 84-169184 | 9/1984 | Japan . |
| 85-306481 | 4/1985 | Japan . |
| 85-218877 | 11/1985 | Japan . |
| 86-042968 | 3/1986 | Japan . |
| 87-266875 | 11/1987 | Japan . |
| 87-266876 | 11/1987 | Japan . |
| 88-308390 | 12/1988 | Japan . |
| 89-050532 | 9/1989 | Japan . |
| 89-276771 | 11/1989 | Japan . |
| 89-297521 | 11/1989 | Japan . |
| 90-036576 | 2/1990 | Japan . |
| 90-052209/08 | 7/1990 | WIPO . |

OTHER PUBLICATIONS

"Vertically Structured Silicon Membranes by Electrochemical Etching" R. Huster and A. Stoffell, Sensors and Actuators A21–A23 (1990) pp. 899–903.

Wise; "VLSI Circuit Challenges for Integrated Sensing Systems"; IEEE; 1990.

Pak et al.; "A New Method of Forming a Thin Single–Crystal Silicon Diaphragm Using Merged Epitaxial Lateral Overgrowth for Sensor Applications"; IEEE Electron Device Letters 12(1991) Nov., No. 11.

European Search Report.

Takahashi et al., Semiconductor Pressure Transducer, Jun. 1980, Abstract United Kingdom Patent No. 2 034 970.

Abstract of WO3506548A, Nov. 1986, Pressure Transducer With Sealed Cavity And Semiconductor Membrane . . . First Material.

Abstract of German Patent 3402–629–A, Jan. 1984, Semiconductor Device Prodn. With Membrane Esp. For Pressure . . . Etching Other Area.

Abstract of German Patent 3723–561A, Jul. 1987, Pressure Transducer Made Using Semiconductor Processing . . . Resistive Effect.

*Primary Examiner*—Jey Tsai
*Attorney, Agent, or Firm*—Morrison & Foerster LLP

[57] ABSTRACT

A method of micromachining silicon to form relatively thick boss areas and relatively thin flexure areas. The method includes the provision of a deep diffusion of n-type dopant atoms in the vicinity of the desired thick boss structures on a p-type silicon substrate. A layer having a thickness equal to the desired thickness of a flexure area is epitaxially grown of n-type doped silicon over the previously doped p-type substrate. Finally, the p-type doped silicon is etched away by a suitable etchant leaving relatively thick boss areas joined by relatively thin flexure areas.

10 Claims, 3 Drawing Sheets

U.S. PATENT DOCUMENTS

| | | | |
|---|---|---|---|
| 4,670,969 | 6/1987 | Yamada et al. | 148/33.2 |
| 4,721,933 | 1/1988 | Schwartz et al. | 333/212 |
| 4,737,473 | 4/1988 | Wilner | 437/154 |
| 4,825,335 | 4/1989 | Wilner | 361/283 |
| 4,838,088 | 6/1989 | Murakami | 73/724 |
| 4,885,621 | 12/1989 | Yoder et al. | 357/26 |
| 4,894,698 | 1/1990 | Hijikigawa | 357/26 |
| 4,904,978 | 2/1990 | Barth et al. | 338/47 |
| 4,908,693 | 3/1990 | Nishiguchi | 357/68 |
| 5,059,543 | 10/1991 | Wise et al. | 437/3 |
| 5,110,373 | 5/1992 | Manger | 437/974 |

METHOD OF PRODUCING A BURIED BOSS DIAPHRAGM STRUCTURE IN SILICON

BACKGROUND OF THE INVENTION

1. Field of the Invention

This invention relates to the micromachining of silicon structures in general and to the manufacture of a buried boss or stiffener structure associated with a pressure sensor diaphragm in particular.

2. Description of the Prior Art

Many micromechanical silicon devices are now well known, including sensors for sensing force, pressure, acceleration, chemical concentration, etc. Such devices are termed "micromechanical" because of their small dimensions on the order of a few millimeters square. Such sizes are achieved by utilizing a photolithographic technique similar to that employed in the fabrication of integrated circuits. Silicon wafers well known in the integrated circuit technology can also be used for micromachined structural elements and have the advantage that additional control or sensing electronic circuitry can be formed in conjunction with the structure providing the sensing, in order to process the resultant electrical signal.

Micromachined silicon is well known in a number of different applications. Many operational devices depend upon the flexing of a thin area of silicon which connects relatively thicker areas of silicon, the so-called "boss" areas. For example, in a pressure transducer, there may be a large, relatively stiff, silicon diaphragm boss bounded by a thin, relatively flexible, area along its periphery which permits the diaphragm to move and the thin area to flex depending upon pressure differentials on the sides of the diaphragm. A detailed discussion of the use of relatively thin flexure areas and relatively thick boss areas for pressure or other type silicon sensors is contained in "Low Pressure Sensors Employing Bossed Diaphragms and Precision Etch-Stopping" by Mallon, Barth, Pourahmadi, Vermeulen, Petersen and Bryzek presented on Jun. 25, 1989 at the International Conference on Solid State Sensors and Actuators in Montreux, Switzerland, herein incorporated by reference.

A schematic of a conventional pressure transducer diaphragm is shown in FIG. 1, wherein an upper silicon substrate 10 is fusion bonded to a lower substrate 12 in a vacuum. A cavity 14 forms a chamber which can provide for the maintenance of a vacuum on one side of diaphragm 16 with external pressure being present on the other side of the diaphragm. Alternatively, a differential pressure sensor could be provided by conducting one pressure to the cavity and conducting a second pressure to the external area of the diaphragm. An accelerometer could also be provided by utilizing a fixed weight mass on the diaphragm with sufficient apertures in the lower substrate 12 so as to prevent any pressure differential across the diaphragm.

In the pressure transducer illustrated in FIG. 1, the diaphragm is maintained in an essentially planar form by the use of an increased thickness x extending across the area of the diaphragm. However, in order to concentrate the stress created by deflection of the diaphragm, narrow grooves form flexures 18. As the diaphragm deflects from its initial position to a deflected position (shown in dotted line form) a uniaxial stress is created and concentrated in a direction parallel to the width of the groove.

As is discussed in U.S. Pat. No. 4,904,978 to Barth et al, a piezoresistive area can be provided in the vicinity of the flexure which will sense the level of stress at the flexure, thereby providing an electrical indication of pressure on the diaphragm. The utilization of the thickened portion of the diaphragm (relative to the thin flexure portion) or "boss" structure serves to insure not only uniaxial stress in the flexure but also a relatively linear response to pressure changes on the diaphragm and avoids deformation of the diaphragm itself by limiting its displacement.

In the past, such thin flexures have been created as a result of a boss or reinforcement structure being buried or created in the areas where the thickened structure is desirable, i.e. diaphragm 16 and the boss 20 between flexures 18. Such a method is illustrated in FIGS. 2a through 2c where a substrate of p-type doped silicon 30 is provided. A deep diffusion of n-type impurities is provided which extends to a depth of x which may be 10 to 20 μm (17 μm in a preferred embodiment). This depth is equal to the desired thickness of the resultant boss or diaphragm structure.

A second, shallower and more general n-type diffusion is made as shown in FIG. 2b to a depth of y which will be the thickness in the flexure region which in a preferred embodiment may be 5 μm. The final step is utilization of an etchant process (such as electrochemical-potassium hydroxide (KOH) etching) which will selectively etch the p-type material which provides the resultant structure shown in FIG. 2c where the bosses have a thickness of x and the flexure areas have a thickness of y.

A problem existing in the creation of the thin flexure areas by a generalized or shallow n-type diffusion is that such a diffusion naturally leads to a non-uniform dopant concentration in the flexure. Obviously, there will be a very high concentration of n-type dopants at the surface but this concentration decreases as the depth below the surface increases. As the depth y is approached, the n-type dopant concentration in the flexures 18 will also vary at different lateral positions having the same depth below the surface of the substrate. The consequence is that when the p-type material is etched away, the boundary between the p-type and n-type dopants in the silicon substrate is not at a uniform depth and differing thicknesses of the flexure material will be present at different lateral locations.

Where the resultant thickness of the boss is on the order of 17 to 20 microns, a variation of perhaps 0.5 microns has very little effect.

However, where the thickness of a flexure area is S microns or less, a variation in thickness of 0.5 microns represents a change of at least 10% or higher. Consequently variations in thickness of the flexure areas will result in non-linearities in the performance of the sensor product.

SUMMARY OF THE INVENTION

In view of the above and other difficulties associated with the conventional method of providing structural reinforcement to flexure areas, it is an object of the present invention to provide a uniform thickness for flexure areas of uniform dopant concentration in conjunction with the generation of buried boss structures.

It is a further object of the present invention to provide a sharp delineation between n and p-type materials to permit close control of flexure thickness.

It is a still further object of the present invention to provide a process for precise control of flexure thickness when machining structural flexure elements in doped silicon.

The above and other objects are achieved by providing an initial deep diffusion of n-type impurities to form the boss structures and then providing an epitaxially grown area of n-type dopant silicon over the p-type substrate of a thickness equal to the desired flexure thickness. The use of an epitaxially grown layer provides an n-type dopant atom distribution which is much more uniform than a surface diffused n-type doped silicon layer and has a sharp change in dopant concentration at the junction between the n and p-type materials. The ability to precisely control thickness of the epitaxially grown layer allows for a high degree of control of the thickness of the layer which will become the flexure portion of the diaphragm.

BRIEF DESCRIPTION OF THE ACCOMPANYING DRAWINGS

Other objects and features of the invention will become apparent to those of ordinary skill in the art by reference to the following Figures wherein.

DETAILED DESCRIPTION OF PREFERRED EMBODIMENTS

Figure 3A:
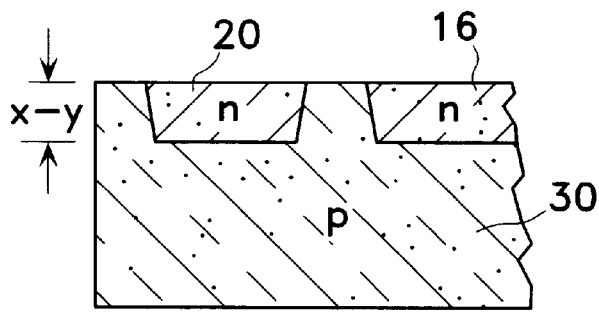
FIGS. 3a through 3c illustrate the present inventive steps for providing a buried boss and a thin flexure area in micromachined silicon.
Figure 3B:
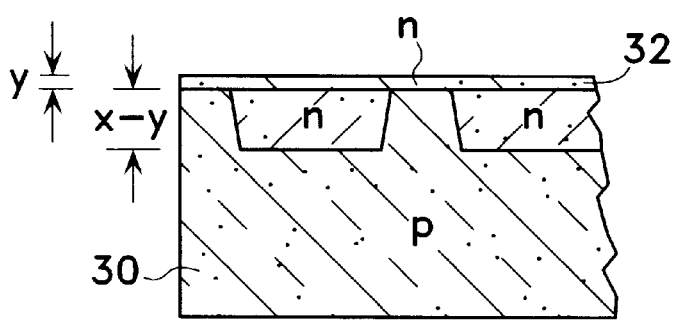
Figure 3C:
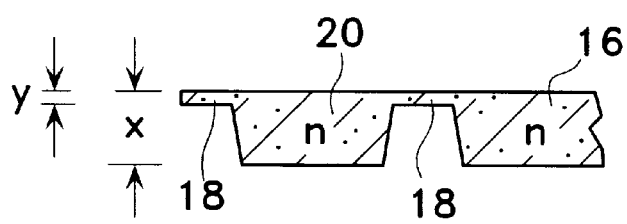

Referring now to the drawings wherein similar reference numbers indicate similar structures among the several views, FIGS. 3a through 3c illustrate the steps of the present invention.

Figure 1:
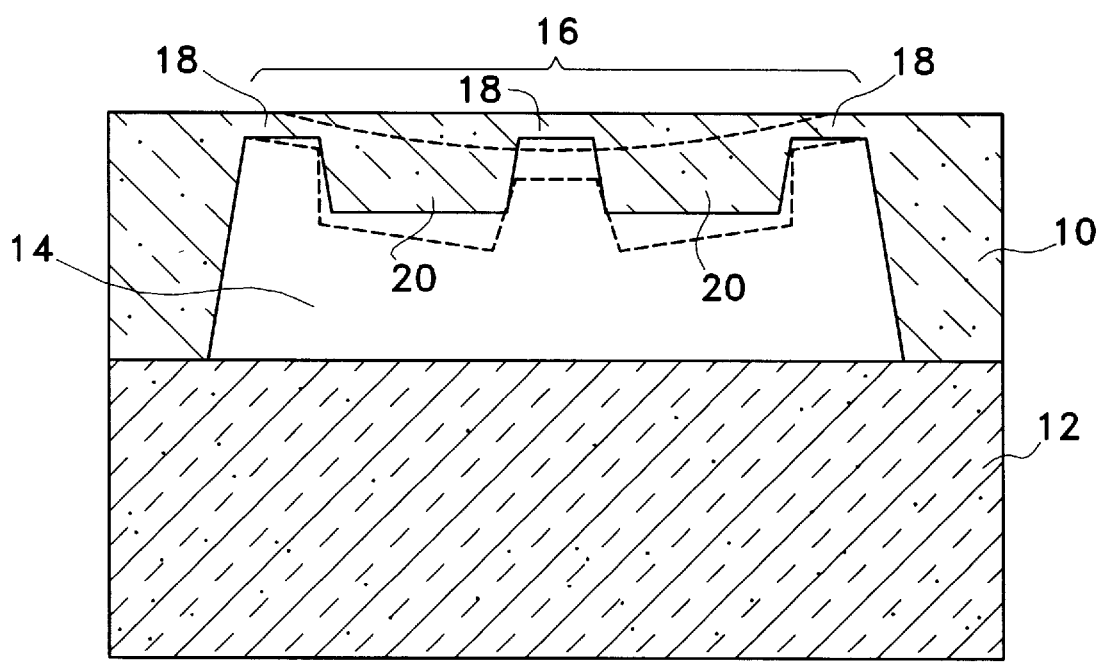
FIG. 1 is a side view partially in section illustrating the operation of a prior art micromachined silicon diaphragm.
Figure 2A:
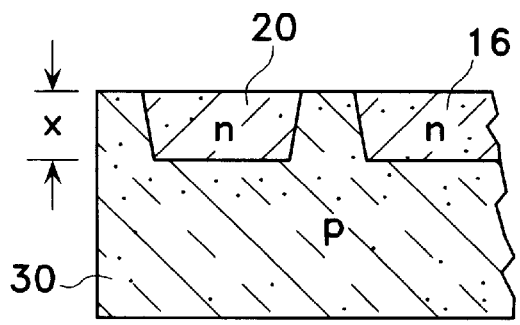
FIGS. 2a through 2c illustrate the prior art steps in constructing a buried boss and thin flexure region in micromachined silicon.
Figure 2B:
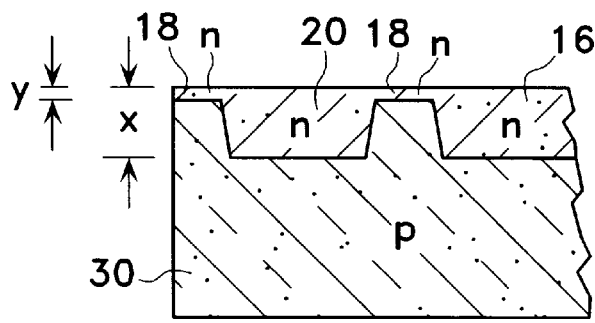

As shown in FIG. 3a, the first process step is similar to the first step of the prior art shown in FIG. 2a, i.e. a deep diffusion of n-type impurities to form the initial boss structure. However, the depth of the diffusion in the prior art step shown in FIG. 2a is equal to the final thickness of the boss structure. In FIG. 3a, the depth of the diffusion is equal to the final thickness minus the thickness of the flexure area (x minus y). This implies that a lower temperature or less time, necessary for this process step, is an advantage.

Figure 2C:
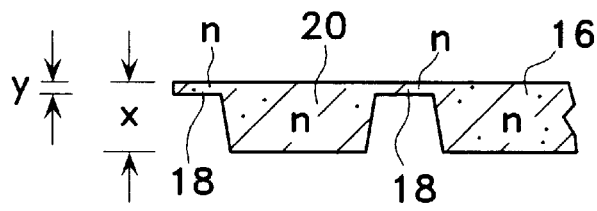

After the initial diffusion, a layer 32 of n-type material is epitaxially grown over the surface of the p-type substrate to a thickness y, equal to the desired flexure thickness. The third step 3c is similar to FIG. 2c of the prior art in that the p-type substrate material is etched away by a suitable p-type etchant leaving a boss 20 having a thickness of x and a flexure area 18 having a thickness of y.

Although in a preferred embodiment, x equals 17 microns and y equals 5 microns, different structural characteristics will require different structural thicknesses. In a preferred embodiment, the starting material was p-type boron doped (100) silicon with a resistivity of 4–6 ohm-cm. The deep diffusion n-type material in the region of the boss structure was made by ion implantation of IE15 phosphorus ions at an energy of 160 KeV using a patterned silicon dioxide mask of 1 μm thickness. It should be noted that the lateral dimensions of the mask must be sized to compensate for lateral diffusion effects following the anneal process.

As is conventional in the industry after high energy implantation, in order to eliminate crystal lattice structure defects and to diffuse the dopants to the proper depth, an annealing step is included. In a preferred embodiment, the p-type substrate was first oxidized for 60 minutes at 1000° C. in steam and then annealed in nitrogen for 16 hours at 1175° C. The oxidation step differentially oxidizes the doped boss regions, thus creating a visible pattern to which the stress-sensing piezoresistors may be later aligned.

The epitaxially grown layer comprises phosphorus doped silicon with a resistivity of 0.6–1.0 ohm-cm grown using a known high temperature single-wafer atmospheric pressure epitaxial reactor process. This process reduces the interdiffusion of dopants at the substrate-epitaxy interface, and other detrimental effects such as autodoping, etc.

As will be known to those of ordinary skill in the art in view of the discussion and the appended Figures, many modifications and variations of the above process will be obvious. Additionally, the process and its variations will have benefit in ant situation where precise thickness control is desirable in machining silicon having variable thicknesses. While this is especially true in diaphragm machining for pressure sensor applications, it is also applicable to flexure machining for accelerometers and other silicon based structures.

Therefore, and in accordance with the above, the present invention is limited not by the specific examples and preferred embodiments discussed above, but rather only by the claims appended hereto.

What is claimed is:

1. A process for forming silicon material having a boss section and a flexure section, said boss section thicker than said flexure section, said process comprising the steps of:

providing a substrate of one type doped silicon material; diffusing another type dopant material into said substrate so as to provide another type doped silicon material at a depth (x-y) from a surface of said one type doped silicon material, said diffusing located only in the regions of the boss section, where x is the boss section thickness and y is the flexure section thickness;

epitaxially growing a layer of said another type doped silicon on said substrate to said flexure section thickness y over the surface of said substrate; and etching away one type doped silicon material with a one type doped silicon etchant leaving said boss section having a thickness x and said flexure section having a thickness y.

2. A method of chemical machining of silicon material to provide a boss section joined by a flexure section from a substrate of p-type doped silicon material, said boss section thicker than said flexure section, said method comprising the steps of:

diffusing n-type dopant material into said substrate so as to provide an n-type material at a depth (x-y) from a surface of the p-type material, said diffusing being provided only in the regions of the boss section, where x is the boss section thickness and y is the flexure section thickness;

epitaxially growing a layer of n-type doped silicon on said substrate to said flexure section thickness y; and etching away p-type doped silicon material with a p-type doped silicon etchant leaving said boss section having a thickness x and said flexure section having a thickness y.

3. A method of chemical machining of silicon material in accordance with claim 2, wherein said diffusing step comprises the steps of:

implantation of n-type dopant ions in said substrate; and annealing said substrate so as to eliminate crystal lattice defects and to at least partially diffuse said dopant ions.

4. A method of chemical machining of silicon material in accordance with claim 3, wherein said diffusing step includes, prior to said implantation step, the step of masking said substrate so as to prevent ion implantation in those areas of said flexure section.

5. A method of chemical machining of silicon material in accordance with claim 4, wherein said substrate is boron doped silicon, wherein said masking step includes providing a mask of silicon dioxide, said ion implantation step includes the step of implanting phosphorus ions.

6. A method of chemical machining of silicon material in accordance with claim 2, wherein said growing step includes the step of epitaxially growing phosphorus doped silicon.

7. A method of chemical machining of silicon material in accordance with claim 6, wherein said growing step includes the step of epitaxially growing phosphorus doped silicon having a resistivity of between 0.6 to 1.0 ohms-cm.

8. A method of chemical machining of silicon material in accordance with claim 2, wherein said etching step includes the step of electrochemical etching said substrate with at least potassium hydroxide (KOH).

9. A method of chemical machining of silicon material in accordance with claim 5, wherein said boron doped silicon material has a resistivity of between 4–6 ohm-cm.

10. A method of chemical machining of silicon material with a boss section joined by a flexure section from a substrate of boron doped silicon material having a resistivity of from 4 to 6 ohms-cm, said boss section thicker than said flexure section, said method comprising the steps of:

(1) providing a mask of silicon dioxide on said substrate over said flexure section;

(2) diffusing phosphorus dopant material into said substrate so as to provide a phosphorus doped silicon material at a depth (x-y) from a surface of the substrate, said diffusing being provided only in the regions of the boss section, where x is the boss section thickness and y is the flexure section thickness, said diffusing step including the steps of:

implantation of phosphorus dopant ions in said substrate; and annealing said substrate so as to eliminate crystal lattice defects and to at least partially diffuse said phosphorus dopant ions;

(3) epitaxially growing a layer of phosphorus doped silicon on said substrate to said flexure section thickness y over the surface of the boron doped silicon substrate and the areas of diffusion phosphorus doped silicon; and (4) etching away boron doped silicon material with a potassium hydroxide etchant leaving said boss section having a thickness x and said flexure section having a thickness y.

* * * * *